United States Patent [19]

Davis et al.

[11] Patent Number: 5,019,300
[45] Date of Patent: May 28, 1991

[54] DIRECT CONTACT WATER-TO-AIR HEAT EXCHANGER AND METHOD

[75] Inventors: Thomas L. Davis; John P. Shell; Robert N. Elliott, III, all of Raleigh; Carsie K. Denning, Coats, all of N.C.

[73] Assignees: Carolina Power & Light Company, Raleigh; North Carolina Alternative Energy Corporation, Research Triangel Park; North Carolina Department of Economic, Raleigh, all of N.C.

[21] Appl. No.: 557,634

[22] Filed: Jul. 25, 1990

[51] Int. Cl.⁵ .............................................. B01F 3/04
[52] U.S. Cl. ................... 261/23.1; 261/109; 261/112.2; 261/DIG. 11
[58] Field of Search ............... 261/112.2, DIG. 11, 261/23.1, 109

[56] References Cited

U.S. PATENT DOCUMENTS

| | | | |
|---|---|---|---|
| 468,919 | 2/1892 | Rettenmeyer | 261/DIG. 11 |
| 808,897 | 1/1906 | Carrier | |
| 850,985 | 4/1907 | Vollmann | 261/DIG. 11 |
| 1,647,281 | 11/1927 | Doyle | 261/DIG. 11 |
| 1,687,542 | 10/1928 | Carrier | 261/DIG. 11 |
| 1,986,529 | 1/1935 | Ray | 261/151 |
| 2,157,318 | 5/1939 | Baehr et al. | 261/19 |
| 2,231,088 | 2/1941 | Richardson | 261/112.2 |
| 2,732,190 | 1/1956 | Mart | 261/DIG. 11 |
| 2,783,982 | 3/1957 | Kahl | 261/112.2 |
| 2,915,302 | 12/1959 | Jacir | 261/109 |
| 2,971,750 | 2/1961 | Boling | 261/DIG. 11 |
| 3,628,311 | 12/1971 | Costarella et al. | 261/117 |
| 3,811,252 | 5/1974 | Evans et al. | 261/109 |
| 3,812,685 | 5/1974 | Brown | 62/93 |
| 3,917,764 | 11/1975 | Phelps | 261/112.2 |
| 3,965,690 | 6/1976 | Berryhill | 261/115 |
| 4,039,307 | 8/1977 | Samuel Bondor | 55/228 |
| 4,067,707 | 1/1978 | Atsukawa et al. | 55/242 |
| 4,138,858 | 2/1979 | Izumi | 62/309 |
| 4,285,703 | 8/1981 | Alexander | 261/23.1 |
| 4,478,767 | 10/1984 | Watanabe et al. | 261/130 |
| 4,857,090 | 8/1989 | Hartness | 261/131 |

OTHER PUBLICATIONS

"Commercial Cooling of Fruits and Vegetables", Agricultural Publications, University of California, 1972.
ASHRAE Refrigeration Handbook, American Society of Heating, Refrigeration, and Air-Conditioning Engineers, Chapter 11, 1990.

*Primary Examiner*—Tim Miles
*Attorney, Agent, or Firm*—Richard S. Faust

[57] ABSTRACT

A direct contact water-to-air heat exchanger includes a columnar air/water contact chamber which includes inclined sheet-like turning vanes for establishing three heat transfer zones therein and a partly countercurrent, partly crosscurrent heat exchange environment. The heat exchanger has applicability for supplying cold moisture laden air in the postharvest forced air precooling of agricultural produce.

20 Claims, 5 Drawing Sheets

DIRECT CONTACT WATER-TO-AIR HEAT EXCHANGER AND METHOD

FIELD OF THE INVENTION

The invention relates to liquid-to-gas heat exchangers. More particularly, the invention relates to a direct contact water-to-air heat exchanger that operates with low power requirements and provides near moisture saturated conditioned air.

BACKGROUND OF THE INVENTION

Water-to-air heat exchangers, or air washers, are apparatus that serve to condition air to a selected lowered or elevated temperature at a desired relative humidity. These apparatus are often used to condition the air in buildings such as textile mills where temperature and relative humidity are important considerations. An example of a system utilized for this purpose is shown in U.S. Pat. No. 3,965,690.

More recently, water-to-air heat exchangers have been used in the postharvest precooling of agricultural produce. In these agricultural applications the produce may be cooled by simply bringing the room containing the produce to a desired temperature and relative humidity. However, the cooling of produce is best achieved, and the freshness of the produce best maintained, by so-called forced air precooling of the produce. In these systems, as generally described in "Commercial Cooling of Fruits and Vegetables", Agricultural Publications, University of California, December, 1972, the air is conditioned to a temperature on the order of 32° F.–36° F. at virtually 100% relative humidity and forced through perforated containers holding produce.

A representative heat exchanger for use in the postharvest forced air precooling of produce is shown at pages 21–22 of the University of California publication referred to above. This heat exchanger takes the form of a vertical chamber which is substantially filled with a packing material. Air to be conditioned is blown upwardly in the chamber in counterflow to water which descends through the chamber. The prior art heat exchangers which have been suggested for use in the mentioned agricultural area are not energy efficient in that the fans required to move the air and the pumps required to move the water consume significantly more energy than is necessary due to, among other things, the substantial back pressure created by the packing material and the substantial quantities of water which must be pumped to achieve the heat transfer, often including recirculation of water through the cooling zone several times.

Thus, it becomes an object of the present invention to provide a heat exchanger that is capable of providing near moisture saturated heated or cooled air in a thermodynamically efficient manner, while reducing the energy required to operate fans and water pumps used to circulate air and water through the heat exchanger.

SUMMARY OF THE INVENTION

The present invention provides a novel direct contact water-to-air heat exchanger that has low power requirements for the circulation of air and water therethrough. The heat exchanger may be used to condition air to either a lowered or elevated temperature at near moisture saturation.

In one aspect, the invention may be defined as a heat exchanger that includes a vertically extending columnar air/water contact chamber. The chamber has a first opening at its lower end for permitting the introduction of air to be conditioned and a second opening at its upper end for permitting discharge of conditioned air. The chamber includes first and second inclined turning vanes which serve to define three zones in the chamber: a first lower zone in which the air flow is substantially horizontal as a continuation of the introduced air, a second middle zone located between the turning vanes wherein the air flow is substantially upward, and a third upper zone in which the flow is at least partially horizontally directed toward the air discharge means. Water at a predetermined temperature is sprayed into the upper portion of the chamber for gravity assisted passage through the three zones. The water is collected at the lower end of the chamber.

Preferably the turning vanes take the form of relatively thin sheets of fluted cooling tower fill material. The chamber is largely open space with the turning vanes having a cumulative thickness of no more than about 3% to about 12% of the height of the chamber. By utilizing this structure and a relatively large chamber cross section, the back pressure experienced by the fans is greatly diminished thereby saving first cost expenses for the installation of the fans and saving on the operating expense of the fans over time. The large volume of the chamber also permits a relatively long dwell time for the water passing therethrough, thereby minimizing the volume of circulating water and the resultant pumping requirement.

In one preferred embodiment the invention takes the form of a water-to-air heat exchanger having two columnar air/water contact chambers separated by a central air handling zone. This embodiment may optionally include means to establish air introduction ports and conditioned air discharge ports on opposed faces thereof.

In another aspect, the invention takes the form of a method of direct contact water-to-air heat exchange wherein air is introduced into a vertically extending columnar air/water contact chamber in a substantially horizontally directed flow proximate the bottom of the chamber. A discharge opening is provided proximate the top of the chamber. The horizontally directed flow of introduced air passes through a first turning vane to turn the air flow by an angle on the order of 90° to an upwardly directed flow and thereafter passes through a second turning vane to turn the air flow again by an angle on the order of 90° to direct the air to the discharge opening. Thus, the flow is subdivided into three zones: a first lower zone in which the air flow is substantially horizontal as a continuation of the introduced air, a second middle zone located between the two turning vanes wherein the air flow is substantially upward, and a third zone in which the air flow is at least partially horizontally directed toward the discharge opening. While the air to be conditioned passes through the chamber, water is sprayed at a predetermined temperature into the chamber to establish a partly countercurrent, partly crosscurrent flow of water to air within the chamber.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
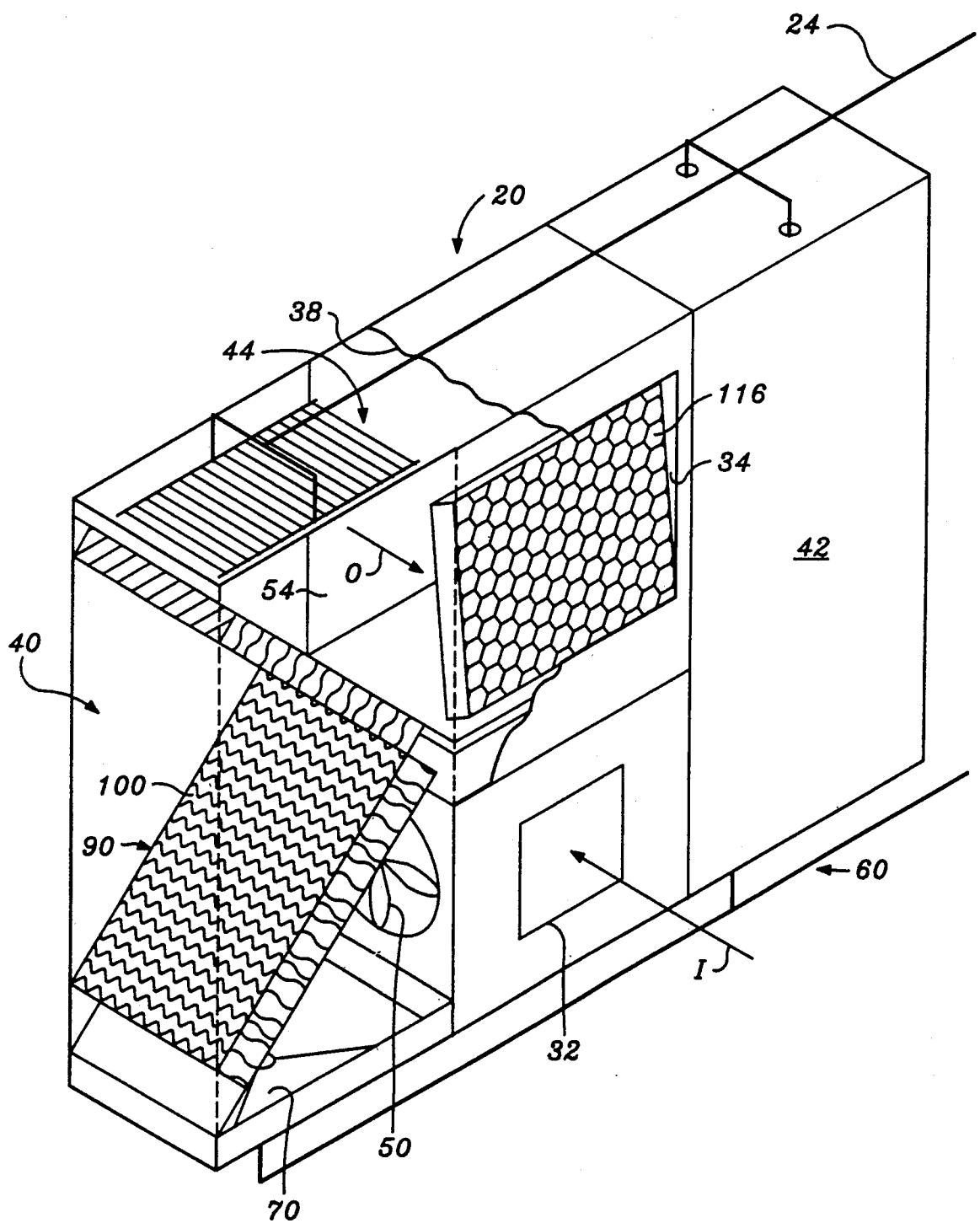
FIG. 1 is a partly broken away, isometric view of a direct contact water-to-air heat exchanger constructed in accordance with the principles of the present invention.

Referring to the drawings, and particularly to FIG. 1, there is shown one embodiment of a direct contact, water-to-air heat exchanger constructed in accordance with the principles of the present invention. Heat exchanger 20 has a generally box-like shape and is connected to a water input line 24 which provides water to the heat exchanger from an appropriate source, for example, from a water chiller or the ice/water mixture of a long term thermal storage tank. Heat exchanger 20 is also connected to a water return line 28 (FIG. 2) which returns water to the water source. Heat exchanger 20 includes an air introduction port 32 for supplying air to be conditioned at the bottom of the heat exchanger in the direction of arrow I and a conditioned air discharge port 34 near the top of the heat exchanger for permitting discharge of conditioned air in the direction of arrow 0. Preferably the heat exchanger is covered with an outer sheathing 38 of foam insulating material, or other suitable thermal insulation material.

A more detailed description of heat exchanger 20 will now be given with continued reference to FIG. 1 and further reference to FIGS. 2, 3A and 3B in which the sheathing and certain outer wall elements have been removed for purposes of illustration. Heat exchanger 20 includes a pair of vertically extending columnar air/water contact chambers 40, 42 which are located on opposite sides of a central air handling section 44. The air handling section includes an air introduction port 32 which communicates with a pair of three-horsepower, 48", industrial grade fans 50, 52 each of which is capable of delivering 15,000 CFM at ⅝" external static pressure. The central section 44 also includes an air discharge port 34 which communicates with air discharge openings 54, 56 located in the upper sidewall portions of the respective contact chambers. Heat exchanger 20 further includes a base 60 formed of aluminum or steel channel pieces generally indicated by the reference numeral 62. Base 60 includes a central support portion 64 for the air handling section 44, and a pair of side support portions 66, 68 which support water collection pan assemblies 70, 72 respectively. Pan assemblies 70, 72 are preferably formed of sheet metal and are located at the bottom of the respective contact chambers 40, 42 for the purpose of collecting water that has passed through the chambers and delivering the same to the water return line 28 by means of the lines 28A, 28B associated with the respective chambers.

A pair of water spray assemblies 76, 78 are located at the upper ends of the respective contact chambers 40, 42. The water spray assemblies communicate with the respective water input lines 24A, 24B which branch off of line 24. Each water spray assembly includes a support member 80 and a water distribution assembly including parallel water distribution pipes 82. The distribution pipes may include lower water discharge openings to disperse water into the chambers. As an alternative embodiment, as is well known in the art, the distribution pipes 82 may include upwardly disposed water ejection openings which serve to direct streams of water from the distribution pipes upwardly and into contact with cover pipes (not shown) from which water droplets fall into the contact chambers 40, 42.

Each chamber 40, 42 is provided with turning vane means which, in the illustrated embodiment, take the form of a pair of sheet-like inclined turning vanes 90, 92. In operation, as the substantially horizontally directed flow of introduced air enters each contact chamber from its respective fan 50, 52 the air passes through the lower turning vane 90 which serves to turn the air flow by approximately 90° to an upwardly directed flow. Thereafter the air passes through the upper turning vane 92 to turn the air flow again by approximately 90° to divert the air in the direction of the discharge openings 54, 56.

As can be readily appreciated, the heat exchanger 20 is of modular construction rendering it adaptable for field assembly. The field assembly is achieved by bolting a welded frame which consists primarily of steel or aluminum angle pieces into the box-like structure of the heat exchanger, plumbing the drains 28A, 28B, installing the spray manifold systems 76, 78, installing the fan boxes for fans 50, 52 and thereafter inserting the turning vanes 90, 92. The entire heat exchanger is then provided with the thermal insulating sheathing 38.

Figure 6A:
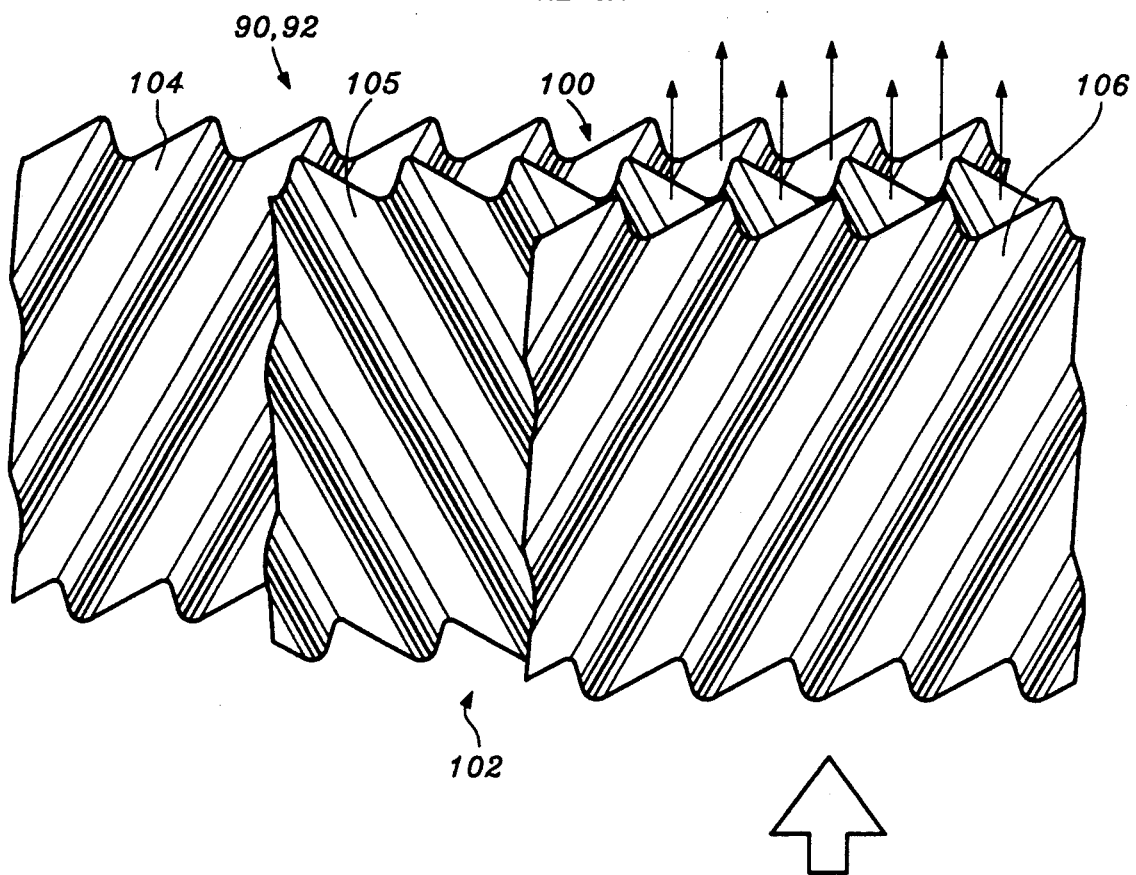
FIG. 6A is an enlarged detailed isometric view of a portion of three of the parallel corrugated sheets forming the turning vanes, with arrows showing the air passage therethrough.
Figure 6B:
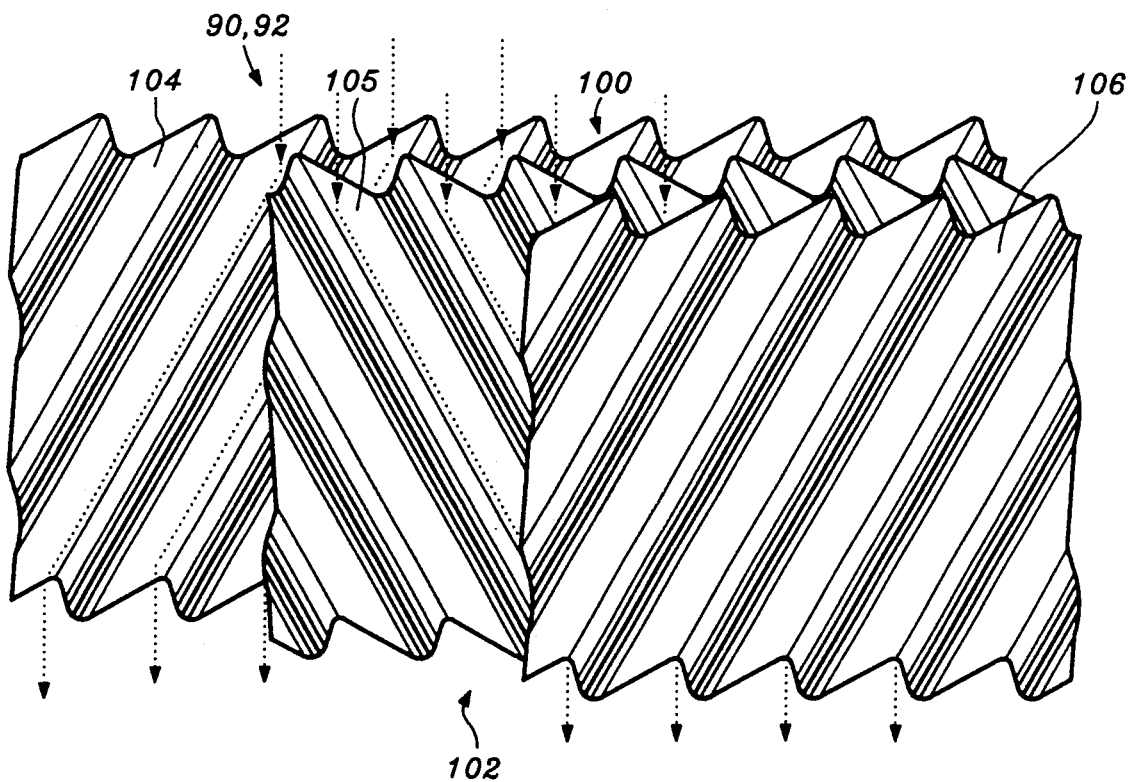
FIG. 6B is a view identical to that of FIG. 6A but showing the descending water path instead of the air path.

The specific structure and function of the turning vanes will now be described with reference to the enlarged views of FIGS. 6A and 6B. The turning vane material preferably comprises a so-called fill material or packing material that is designed to enhance heat exchange between a liquid and a gas that are simultaneously flowing therethrough in opposite directions. In the illustrated embodiment, the turning vane is formed of a self supported fluted cooling tower fill material that has parallel opposed faces 100, 102. The preferred material is PLASdek ® counterflow cooling tower fill material with "drip edge," product no. 8560, corrugation angle 30°, manufactured by The Munters Corporation of Fort Myers, Fla. FIGS. 6A and 6B show portions of three of the stacked corrugated sheets 104, 105, 106 that form the preferred PLASdek ® material. Sheets 104 and 106 have parallel corrugations that run at an angle of 30° from faces 100, 102. The inner sheet 105 has corrugations that are also inclined at 30° from faces 100, 102, but in the opposite direction from those of sheets 104, 106. Referring to FIGS. 1 and 3, face 100 of the packing material is the upper face of turning vane 90 while face 102 is the lower face. FIG. 6A shows that air passing from face 102 to face 100 of the material, as oriented in the manner of turning vane 90, causes the air to turn. FIG. 6B shows the path of water descending through the material to the lower face 102, which includes the PLASdek ® drip edge structure that encourages even water distribution.

Figure 2:
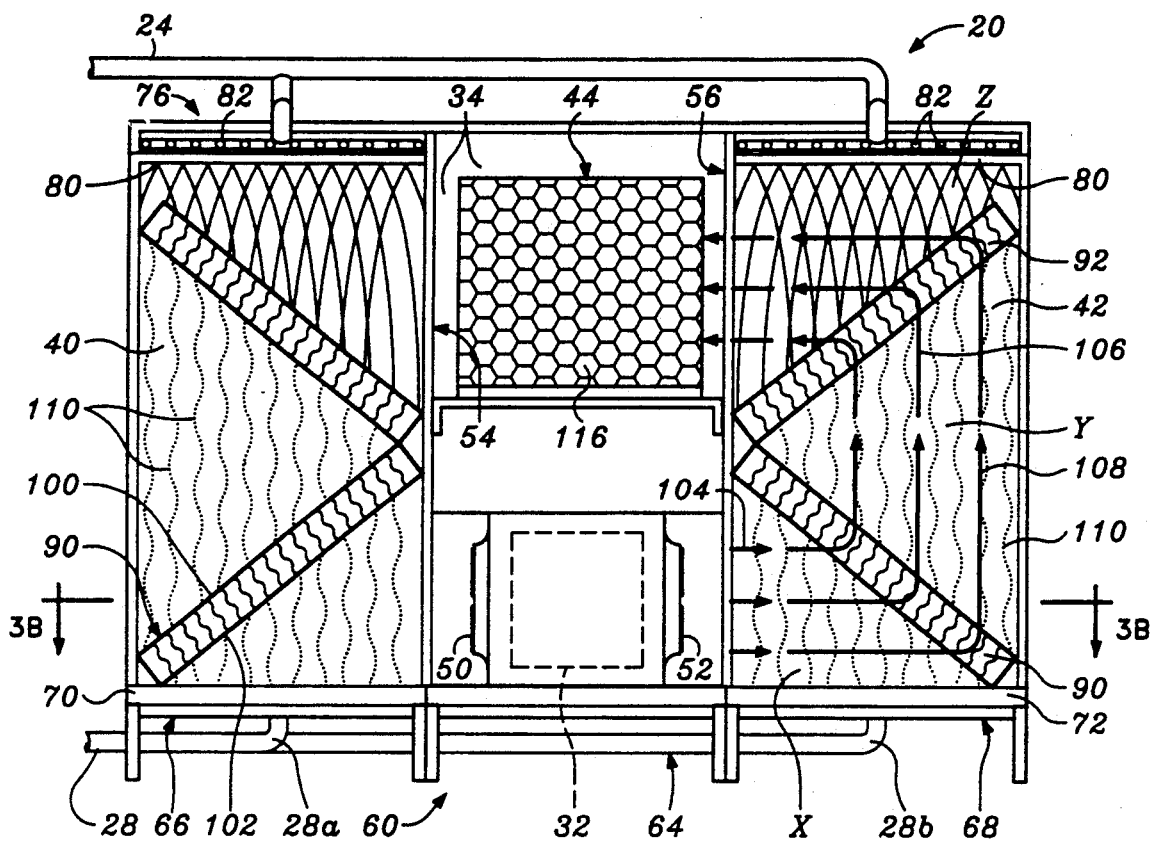
FIG. 2 is an elevation view of the heat exchanger of FIG. 1 with the front cover panel and the thermal insulation sheathing removed to facilitate illustration.
Figure 3A:
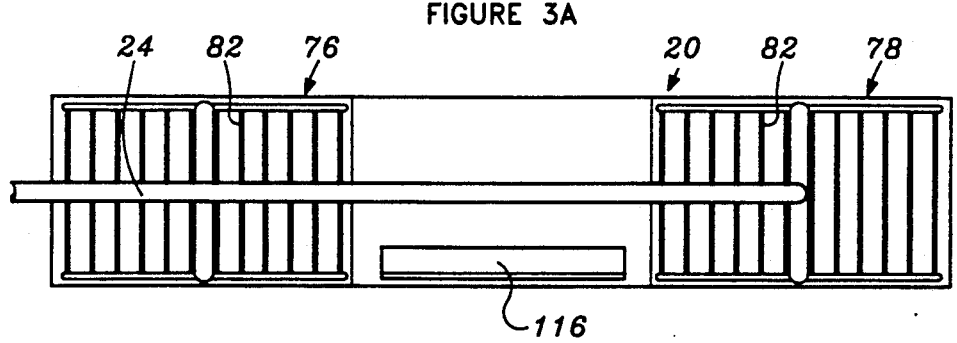
FIG. 3A is a top plan view of the heat exchanger with the top panel and sheathing removed to facilitate illustration.
Figure 3B:
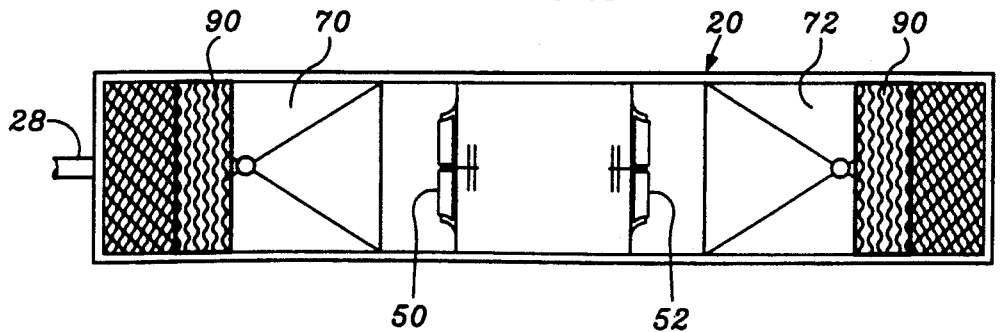
FIG. 3B is a horizontal section view of the heat exchanger taken substantially along line 3B—3B of FIG. 2.

Referring to FIG. 2, the lines and directional arrows designated by reference numerals 104, 106, 108 generally indicate the directional flow of air passing through contact chamber 42. As the air enters chamber 42 from fan 52 it generally continues the horizontal flow direction imparted by the fan. As the air strikes first turning vane 90 its direction is turned by an angle on the order of 90° to create an upwardly directed flow. Next the air passes through second turning vane 92 to turn the air by an angle on the order of 90° to direct the air toward the discharge opening 56. Thus, the air flow is subdivided within chamber 42 to three zones, a first lower zone X in which the air flow is substantially horizontal as a continuation of the introduced air, a second middle zone Y located between the two turning vanes wherein the air flow is substantially upward, and a third upper zone Z in which the air flow is at least partially horizontally directed toward the discharge opening 56.

The downward gravity assisted flow of water through contact chamber 42 is depicted by the lines and directional arrows 110 in FIG. 2. The water first falls through zone Z until it contacts turning vane 92. The water passes through the fluted material of turning vane 92 in such a fashion that the residence time of the water in chamber 42 is increased, thereby affording ample opportunity for water-to-air heat exchange while the water passes through this material. Also, as mentioned above, the drip edge of the material encourages even water distribution as it exits the turning vane. As the water leaves turning vane 92 it falls through zone Y, directly countercurrent to the upflow of air. Next, the water passes through turning vane 90, through zone X and into the water collection pan assembly 72. It will be appreciated that the above water and air routes within chamber 42 creates a partly countercurrent partly crosscurrent flow of air to water within the chamber. The flow in chamber 40 is substantially the same.

The design of heat exchanger 20 permits it to be operated with very low power requirements for the fans or blowers that drive air through the chambers. One reason for this is that the packing material of the turning vanes takes up a very small percentage of the total volume of the contact chamber. In this regard, the cumulative thicknesses of the packing material of turning vanes 90, 92 should be limited to less than 20% of the height of the chamber, with 3% to 12% being preferred. Thus, the resistance to air flow created by the packing material of the turning vanes is significantly reduced over that encountered in typical chambers that are essentially filled with packing material. Second, the air velocity at the face of the turning vanes is substantially less than that in typical heat exchangers, thereby reducing the dynamic pressure drop as the air passes through this material. The reduced velocity is achieved in part by the 45° inclination of the packing material to the air flow direction, so that the total surface area of the material is larger than the cross sectional area of the chamber by a factor of $\sqrt{2}$; i.e., about 1.4 times larger. Furthermore, the air velocity can be reduced substantially by increasing the total volume of the contact chamber over that which would ordinarily be used for a heat exchanger of the same nominal SCFM rating.

Referring to FIG. 3, an optional mist eliminator 116 is incorporated into heat exchanger 20 between the conditioned air discharge port 34 and the discharge openings 54, 56. The mist eliminator operates in a fashion well known in the art to separate entrained water droplets from the cold air stream emerging from the heat exchanger. A preferred mist eliminator material is DRIFdek ® material manufactured by The Munters Corporation of Fort Myers, Fla.

The provision of mist eliminator 116 permits the operation of heat exchanger 20 at operating parameters that create a substantial entrainment of water droplets in the portion of air handling section 44 between discharge openings 54, 56 and port 34. Thus, when the heat exchanger is so operated a significant water-to-air heat transfer can occur in this zone, thereby defining a fourth heat transfer zone in addition to the three zones X, Y, Z, discussed above.

Figure 4:
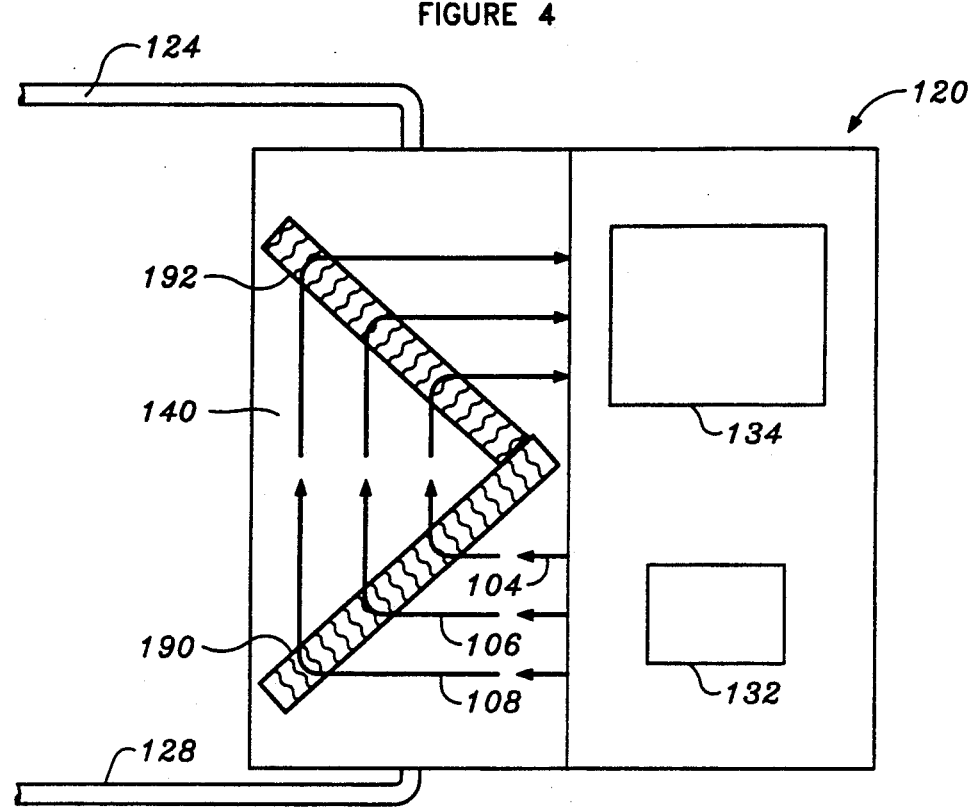
FIG. 4 is a view similar to that of FIG. 2 but showing an alternative embodiment of the heat exchanger of the invention which includes only one vertically extending contact chamber.

Referring to FIG. 4, there is shown a first alternative embodiment heat exchanger 120 which includes a single vertically oriented contact chamber 140 and associated air introduction port 132 and conditioned air discharge port 134. The heat exchanger 120 also includes a single water introduction line 124 and a single water discharge line 128. The flow of water and air through contact chamber 140 is substantially identical to that which occurs within chamber 40 of the heat exchanger illustrated in FIGS. 1-3. The turning vanes 190, 192 are constructed and angularly disposed in an identical fashion to the turning vanes illustrated in FIGS. 1-3.

Figure 5:
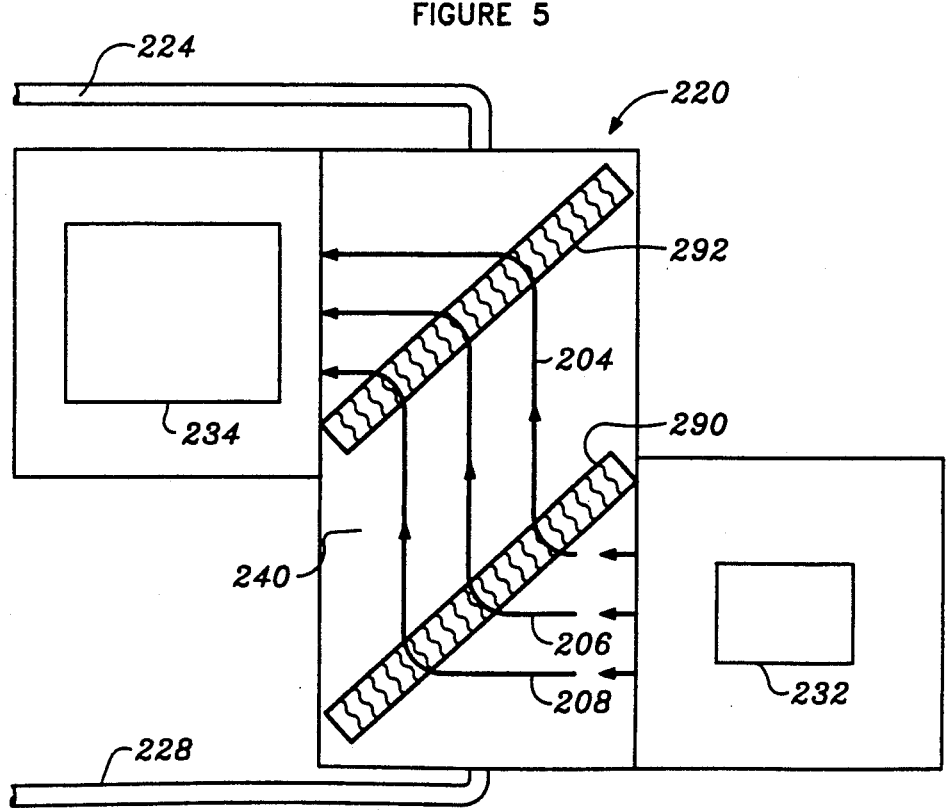
FIG. 5 is a view similar to that of FIG. 4 but showing another alternative embodiment of the heat exchanger of the invention which includes only one vertically extending contact chamber and parallel turning vanes so that the air return and air supply are located on opposite sides of the chamber.

FIG. 5 illustrates a second alternative embodiment heat exchanger 220 which includes a columnar contact chamber 240, a single water introduction line 224 and a single water discharge line 228. Heat exchanger 220 differs from the previously described heat exchanger 120 in that the air introduction port 232 is located on the opposite side of the contact chamber 240 from the conditioned air discharge port 234. This configuration is achieved by disposing the turning vanes 290, 292 in an inclined parallel orientation as illustrated, resulting in an air flow as generally indicated by the arrows 204, 206, 208.

Figure 7:
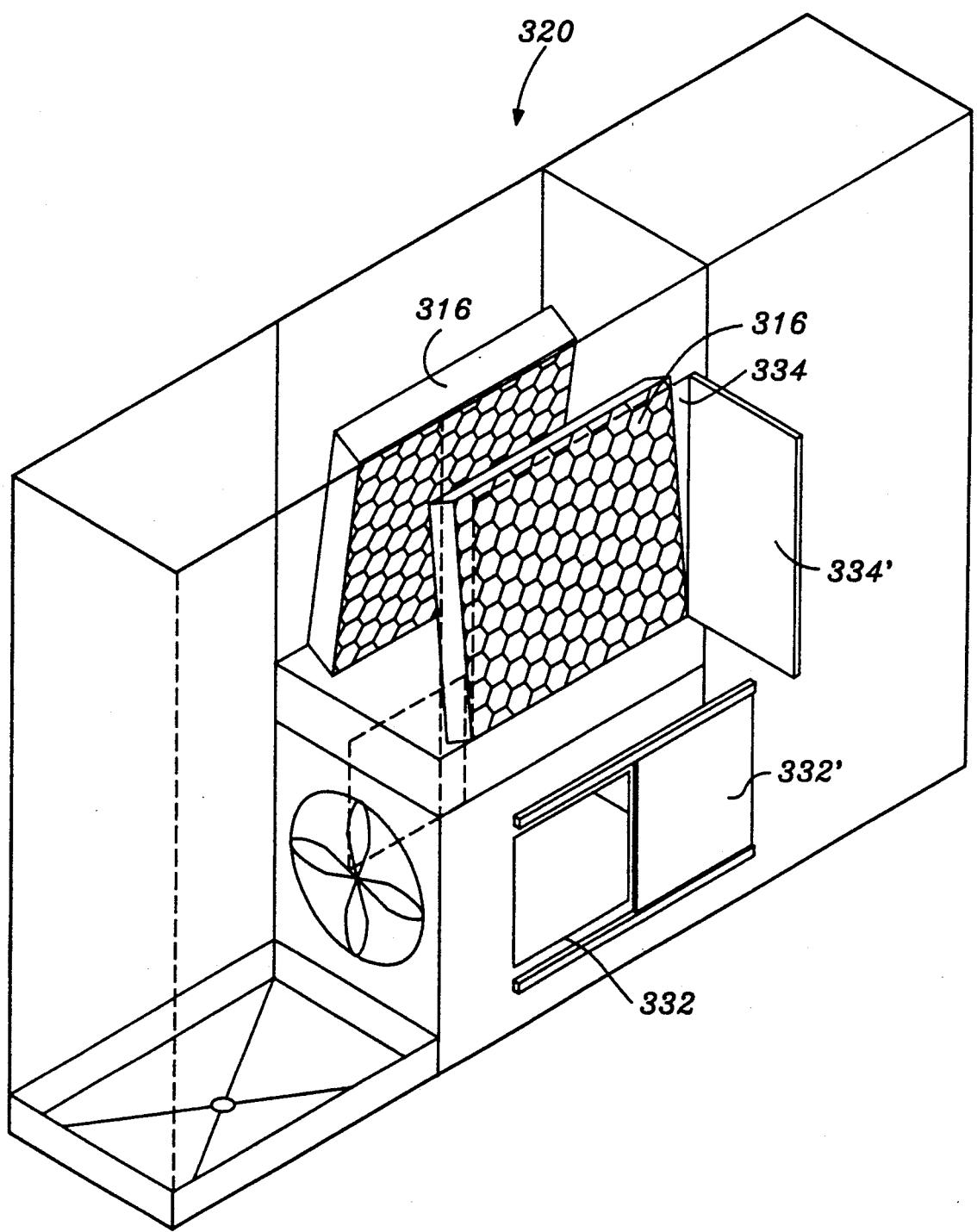
FIG. 7 is a view showing a heat exchanger of substantially identical construction as that of FIG. 1 except for the provision of a dual access feature that selectively permits air suction/discharge on both faces of the heat exchanger.

FIG. 7 illustrates a third alternative embodiment heat exchanger 320 that is identical to heat exchanger 20 except for the provision of a "dual access" feature. Heat exchanger 320 has an air introduction port 332 and conditioned air discharge port 334 on one side, and a second pair of identical ports (not shown) on the other side. A hinged door 334' selectively opens or closes each port 334 while a sliding door 332' does the same for each port 332. The doors enable heat exchanger 320 to operate with either side being the working face. This configuration has utility in the postharvest forced air cooling of fruits and vegetables in a multi-bay arrangement where one bay is disposed on one side of heat exchanger 320 and another bay on the other side. Thus, the operator may condition the air in one bay while the other bay is not in need of cold air, for example, when it is being loaded or unloaded.

Summary of Certain Features and Advantages of the Invention

1. It will be appreciated that the invention has utility in both cooling and heating applications. Examples of cooling applications are in postharvest produce precooling and textile mill space cooling. An example of the heating applications is the postharvest curing of crops, for example, sweet potatoes.

2. The invention permits the use of a relatively poor quality water. In typical heat exchangers that use small orifice sprayers, poor water quality may not be acceptable due to fouling or scaling.

3. The turning vanes formed of fluted packing material serve three purposes. First, the vanes alter the direction of air flow. Second, a significant heat exchange takes place within the material. Third, the material serves to uniformly distribute the descending water as small drops across substantially the entire cross section of the contact chamber.

4. The heat exchanger of the invention is well adapted to being used in agricultural postharvest cooling applications where the floorspace in the warehouse is at a premium. In one preferred embodiment, the heat exchanger is placed at the end of each cooling bay of the warehouse and is so configured to extend across the entire width of the bay while extending upwardly from floor to ceiling, thereby minimizing its "footprint". In a system having cooling bays with a width of approximately 25 feet, a heat exchanger measuring 25 feet by 5 feet at the base and extending over 17 feet high may be used to rapidly cool 30,000 pounds of produce such as green peppers from an initial produce temperature of approximately 95° F. to a cooled produce temperature of approximately 45° F. The operating parameters for this heat exchanger, constructed as shown in FIG. 1, was 125 gpm cold water supply at approximately 32°-36° F. and 25,000 CFM air flow. The residence time for both the air and water in this large, low flow rate application produces excellent thermodynamic heat transfer efficiencies, while maintaining the low fan and water pumping requirements mentioned above.

While the present invention has been described with reference to specific embodiments, it will be appreciated that modifications may be made without departing from the true spirit and scope of the invention.

That which we claim is:

1. A direct contact water-to-air heat exchanger characterized by low power requirements for the circulation of air and water therethrough and the thermodynamically efficient provision of near moisture saturated cooled or warmed conditioned air to satisfy a cooling or heating load, said heat exchanger comprising:

a vertically extending columnar air/water contact chamber defining upper and lower ends and a sidewall structure;

an opening in the sidewall structure proximate the lower end of the chamber for permitting introduction of air to be conditioned into the chamber in a substantially horizontal flow direction;

an opening in the sidewall structure proximate the upper end of the chamber for permitting discharge of conditioned air from the chamber;

first inclined turning vane means located in the lower part of said chamber;

second inclined turning vane means located in the upper part of said chamber;

said first and second turning vane means serving to define three zones in said chamber, a first lower zone in which the air flow is substantially horizontal as a continuation of the introduced air, a second middle zone located between the turning vanes wherein the air flow is substantially upward, and a third upper zone in which the flow is at least partially horizontally directed toward the air discharge means;

water spray means located at the upper end of said chamber for spraying water at a predetermined temperature into said chamber for a downward gravity assisted passage through the three zones; and water collection means located at the lower end of said chamber for collecting water that has passed through the chamber.

2. The heat exchanger of claim 1 wherein said turning vane means comprise first and second turning vanes that are inclined at an angle on the order of about 45° from vertical.

3. The heat exchanger of claim 1 wherein said turning vane means comprise first and second turning vanes that are inclined at an angle in the range of about 30° to about 60° from vertical.

4. The heat exchanger of claim 3 wherein each turning vane presents substantially parallel, planar top and bottom surfaces.

5. The heat exchanger of claim 4 wherein said vanes are alternately inclined, creating a substantially > orientation within said chamber.

6. The heat exchanger of claim 4 wherein said turning vanes are parallel.

7. The heat exchanger of claim 4 including two columnar contact chambers separated by a central air handling zone.

8. The heat exchanger of claim 7 wherein said central air handling zone includes a lower air introduction port and associated fan means for delivering air to be conditioned to the air introduction openings of each columnar contact chamber and an upper conditioned air discharge port for discharging conditioned air from the air discharge openings of the two columnar contact chambers.

9. The heat exchanger of claim 4 wherein said turning vanes comprise cooling tower fill material.

10. The heat exchanger of claim 9 wherein said turning vanes comprise stacks of corrugated sheets with alternating flute orientation.

11. The heat exchanger of claim 10 wherein the flutes are inclined with the inlet face of the turning vane at alternating angles in the range of about 30° to 45°.

12. A method of direct contact, water-to-air heat exchange characterized by low power requirements for the circulation of air and water therethrough, said method comprising:

introducing air to be conditioned into a vertically extending columnar air/water contact chamber in a substantially horizontally directed flow proximate the bottom of the chamber;

providing a discharge opening proximate the top of the chamber;

passing the horizontally directed flow of introduced air through a first turning vane to turn the air flow by an angle on the order of 90° to an upwardly directed flow and thereafter passing the air through a second turning vane to turn the air flow again by an angle on the order of 90° to direct the air to the discharge opening, thereby subdividing the flow of air within the chamber into three zones, a first lower zone in which the air flow is substantially horizontal as a continuation of the introduced air, a second middle zone located between the two turning vanes wherein the air flow is substantially upward, and a third upper zone in which the air flow is at least partially horizontally directed toward the discharge opening;

while introducing the air to be conditioned and passing it through the chamber, spraying water at a predetermined temperature into the chamber from an upper portion thereof and passing the water by gravity through the three zones to establish a partly countercurrent, partly crosscurrent flow of water to air within the contact chamber; and providing a thermodynamically efficient heat transfer between the water and air in the three zones while minimizing the power requirement to circulate air and water through the chamber.

13. The method of claim 12 wherein the first and second turning vanes comprise fluted cooling tower fill material formed of stacks of corrugated sheets with alternating flute orientation.

14. The method of claim 12 including the step of minimizing air drive power requirements by maintaining the cumulative thicknesses of the two turning vanes at less than about 20% of the height of the contact chamber.

15. The method of claim 12 wherein the cumulative thickness of the two turning vanes is on the order of about 3% to about 12% of the height of the contact chamber.

16. A direct contact water-to-air heat exchanger characterized by low power requirements for the circulation of air and water therethrough and a thermodynamically efficient provision of near moisture saturated cooled or warmed air to satisfy a cooling or heating load, said heat exchanger comprising:

a pair of vertically extending columnar air/water contact chambers, each chamber defining upper and lower ends and a sidewall structure;

an air handling section located between said contact chambers;

an opening in the sidewall structure proximate the lower end of each chamber for permitting introduction of air to be conditioned into the chamber from said air handling section in a substantially horizontal flow direction;

an opening in the sidewall structure proximate the upper end of each chamber for permitting discharge of conditioned air from each chamber into the air handling section;

a first inclined turning vane located in the lower part of each chamber;

a second inclined turning vane located in the upper part of each chamber;

the first and second turning vanes in each chamber serving to define three zones in the chamber, a first lower zone in which the air flow is substantially horizontal as a continuation of the introduced air, a second middle zone located between the turning vanes wherein the air flow is substantially upward and a third upper zone in which the flow is at least partially horizontally directed toward the air discharge means;

water spray means located at the upper end of each chamber for spraying water at a predetermined cold temperature into said chamber for a downward gravity assisted passage through the three zones; and water collection means located at the lower end of each chamber for collecting water that has passed through the chamber.

17. The heat exchanger of claim 16 wherein said first and second turning vanes are inclined at an angle on the order of 45° from vertical.

18. The heat exchanger of claim 16 wherein the cumulative thickness of the first and second turning vanes is on the order of about 3% to about 12% of the height of the contact chamber.

19. The heat exchanger of claim 16 including a mist eliminator located in said air handling section between the air introduction and discharge openings of the two chambers and the discharge port of the heat exchanger.

20. The heat exchanger of claim 16 including means in said air handling section for selectively providing dual access to said heat exchanger on the opposite faces thereof.

* * * * *